(12) United States Patent
Ohta

(10) Patent No.: US 7,312,872 B2
(45) Date of Patent: Dec. 25, 2007

(54) SYSTEM AND METHOD FOR AUTOMATED POSITIONING OF CAMERA

(75) Inventor: Shuto Ohta, Los Gatos, CA (US)

(73) Assignee: Fujitsu Limited, Kawasaki (JP)

( * ) Notice: Subject to any disclaimer, the term of this patent is extended or adjusted under 35 U.S.C. 154(b) by 238 days.

(21) Appl. No.: 11/081,225

(22) Filed: Mar. 16, 2005

(65) Prior Publication Data

US 2006/0209303 A1 Sep. 21, 2006

(51) Int. Cl.
*G01B 11/00* (2006.01)

(52) U.S. Cl. .............................. 356/400; 345/7; 345/8; 345/115

(58) Field of Classification Search .......... 356/614–22, 356/400; 250/338.1, 205, 559.07, 557, 221; 348/169, 164, 211.99; 398/106; 345/8, 345/115; 396/56, 396

See application file for complete search history.

(56) References Cited

U.S. PATENT DOCUMENTS 7,068,306 B2 *  6/2006  Pyle et al. ................ 348/211.9
7,071,898 B2 *  7/2006  Hobgood et al. .............. 345/7

\* cited by examiner

*Primary Examiner*—Gregory J. Toatley, Jr.
*Assistant Examiner*—Abdullahi Nur
(74) *Attorney, Agent, or Firm*—Baker Botts L.L.P.

(57) ABSTRACT

A system and related method are provided for automated positioning of camera. The system includes a remote control configured to generate a spot signal in response to input from a user. The camera generates image data of the camera's field of view. The camera is captures the spot signal within the image data. The camera includes a positioning subsystem configured to orient the camera. The system further includes a processing subsystem configured to identify the location of the spot signal within the image data. Based upon the identified location, the processing subsystem provides instructions to the positioning subsystem to reorient the camera. In this manner, users of the system can align the camera upon a prescribed location, without needing to monitor camera output to ensure proper alignment.

32 Claims, 4 Drawing Sheets

SYSTEM AND METHOD FOR AUTOMATED POSITIONING OF CAMERA

FIELD OF THE INVENTION

This invention is related to digital cameras, and is particularly related to systems and methods for automated positioning of such cameras.

BACKGROUND OF THE INVENTION

Digital cameras used with teleconference systems and with personal computers, are commonly mounted to enable adjustable positioning of the camera for proper framing of a subject. Positioning systems preferably have two degrees of freedom, enabling both pan and tilt of the camera. Such systems are beneficially used in applications requiring adjustable coverage of a large area, such as with teleconference systems.

Whether the camera positioning system is controlled by physical manipulation or automated with aid of a remote control device, a user typically must monitor the video output while positioning the camera to ensure that the desired camera orientation is achieved.

Therefore, be appreciated that there exists a need for a system and method for automated positioning of a camera that addresses the shortcomings addressed above. The invention fulfills this need and others.

SUMMARY OF THE INVENTION

In one aspect the present invention is directed to a system for automated positioning of a camera, comprising a remote control for transmitting a spot signal when actuated by a user, a digital camera for generating image data representative of an image received by the camera, the image data including spot signal data, an automated positioning subsystem configured to orient the camera; and a processing subsystem for receiving the image data and identifying the location of the spot signal within the image, and for providing instructions to the automated positioning subsystem to align the camera based upon the location of the spot signal. Preferably, the automated positioning system comprises the ability to rotate the camera about vertical and horizontal axes, and the remote control device has a button for actuating transmission of the spot signal. In a further aspect, the system includes a wireless communication port for receiving an activation signal from the remote control for activating the camera alignment process and the wireless communication port is configured to be activated by the spot signal, such that the spot signal is the activation signal. In such case, the signal may be an infrared signal. In one embodiment, the camera has an autofocus function and the infrared signal also activates the autofocus function. Alternatively, the wireless communications port may be a radio receiver. The remote control device may have a delay circuit for keeping the spot signal on for a predetermined period of time after it has been actuated. The processing subsystem may be an external computer coupled to the camera. Alternatively the processing subsystem may be housed within the camera. The positioning subsystem may include at least one motor.

In another aspect the present invention is directed to a system for automated positioning of a camera, comprising a remote control configured to generate an IR signal when actuated by a user; a digital camera having a field of view and comprising an image sensor for generating image data, the image data including the IR signal as a source spot whenever the IR signal is generated within the field of view, a positioning subsystem configured to rotate the camera about at least one axis; and a wirelessly actuated processing subsystem which, when actuated, identifies the location of source spot within the image data and provides instructions to the positioning subsystem to rotate the camera into alignment with the source spot. The processing subsystem may be at least partially housed within the digital camera. In addition, the positioning system may be configured to rotate the camera about vertical and horizontal axes and the processing subsystem is configured to instruct the positioning subsystem to center the orientation of the camera on the location of the source spot. Further, the remote control may be configured to emit a signal that wirelessly actuates the processing subsystem. The IR signal may both wirelessly actuate the processing system and serve as the source spot. The processing subsystem may be configured to iteratively analyze the image data until the camera is determined to be in alignment.

The present invention further comprises a method of automated positioning of a camera, comprising transmitting a spot signal from a remote source, using a digital camera to generate image data representative of the image within the camera's field of view, the image data including the spot signal, using an image processor coupled to the camera to locate the spot signal within the image data, and using an automated positional control system coupled to the image processor to rotate the camera such that the spot signal is aligned at a desired position within the image data. The step of aligning the camera at a desired location may be performed iteratively, and the step of rotating may include rotation about vertical and horizontal axes. In one aspect of the method, the desired location is the center of the image. The transmitted spot signal may be an IR signal generated by a remote control device, and the remote control device may also be used to actuate the step of aligning the camera. The image processor may be contained within the camera or may be an external computer coupled to the camera.

In yet another aspect, the present invention is directed to an automated camera for a teleconference system, comprising an image processor for generating image data corresponding to the image in the camera's field of view, the image processor being responsive to infrared light emitted from a remote control device, an automated positioning system for rotating the camera about at least one axis in response to instructions from an image analysis system, and at least one data communications bus for coupling the image data from the image processor to the image analysis system and for coupling instructions from the image analysis system with the automated positioning system. The image analysis system may be housed within the camera. The camera may comprise a wireless communications port for receiving a signal from the remote control device which activates the image analysis system.

For purposes of summarizing the invention and the advantages achieved over the prior art, certain advantages of the invention have been set forth. It is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

All of the embodiments described herein are intended to be within the scope of the present invention. However, the invention is not limited to the disclosed embodiments.

BRIEF DESCRIPTION OF THE DRAWINGS

The foregoing aspects of the attendant advantages of this invention will become more readily apparent by reference to the following detailed description when taken in conjunction with the accompanying drawings wherein.

Reference symbols are used in the figures to indicate certain components, aspects or features shown therein, with reference symbols common to more than one figure indicating like components, aspects or features shown therein.

DETAILED DESCRIPTION

Figure 1:
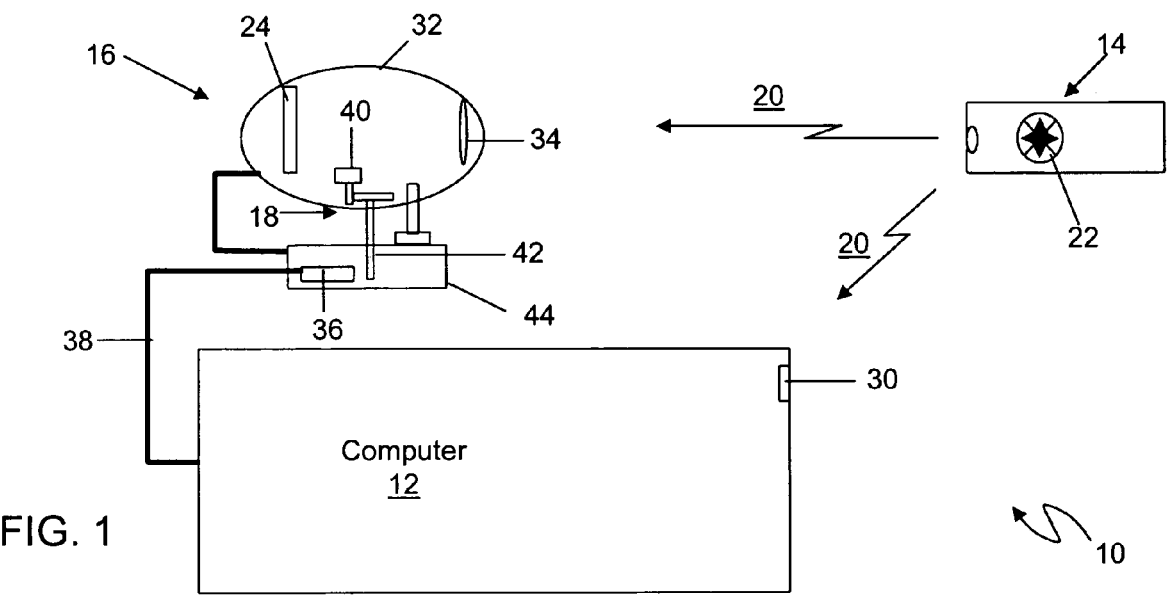
FIG. 1 is a schematic cross-sectional view of a system for automated positioning of a camera in accordance with an embodiment of the invention.
Figure 2:
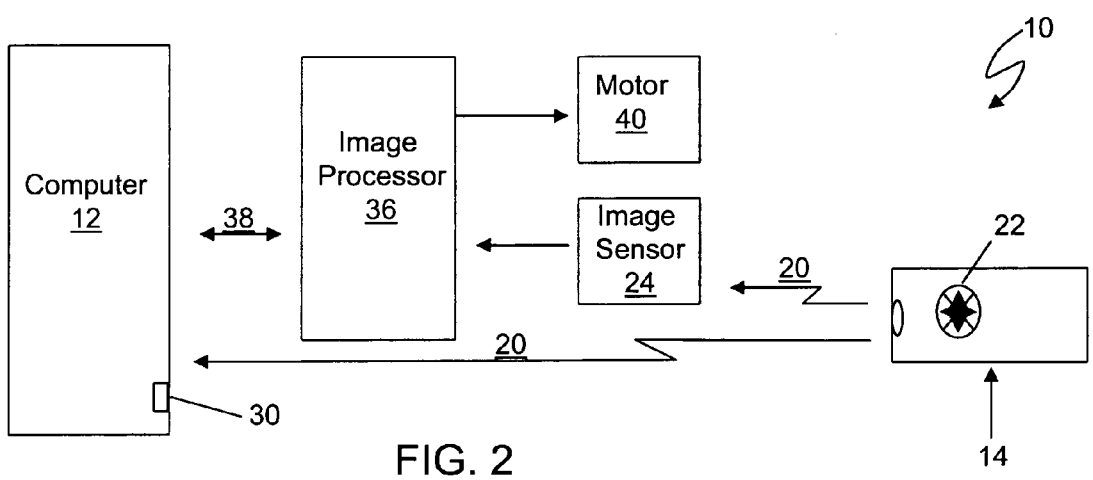
FIG. 2 is a simplified block diagram of the system of FIG. 1, depicting exemplary communication paths among various components.

Referring now to the drawings, and particularly FIGS. 1-2, there is shown an embodiment of the present invention comprising system 10 for automated positioning of a camera. Briefly, system 10 includes a computer 12, a remote control 14 and a camera 16 which generates image data. System 10 includes a positioning subsystem 18 configured to orient the camera by rotating it horizontally and/or vertically about one or two axes. When actuated by a user, remote control 14 emits a spot signal 20, and the camera captures the signal as a source spot within the image data. System 10 further includes a processing subsystem configured to identify and locate the source spot within the image data. Based upon the identified location, the processing subsystem generates and provides instructions to the positioning subsystem to align the camera. In this manner, a user of the system can align the camera at a desired position in a single step, without needing to monitor camera output to ensure proper alignment. Instead, a user can simply activate the remote, as discussed, causing the camera to align itself automatically.

Figure 3:
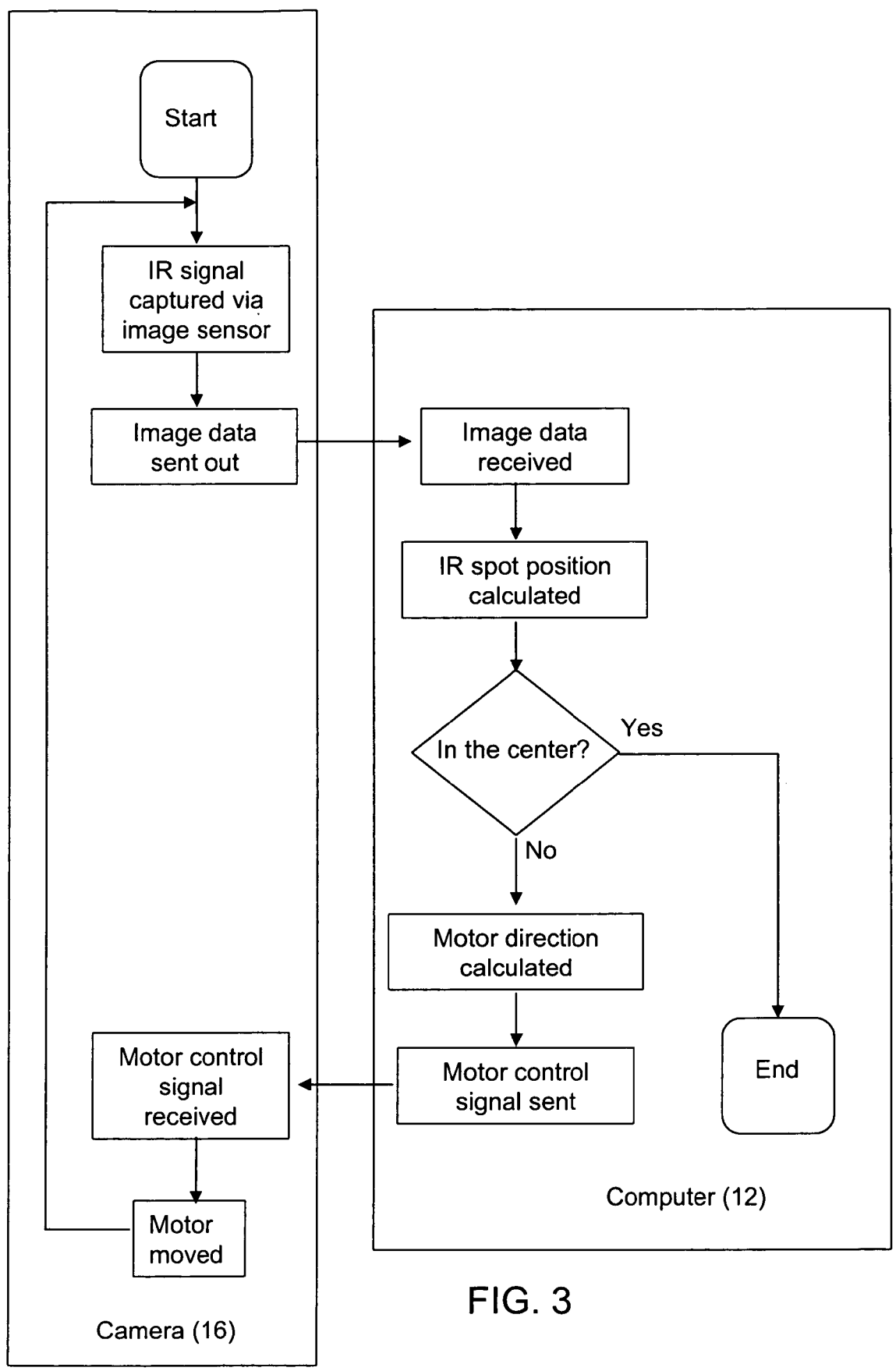
FIG. 3 is a simplified flow chart for operation of the system of FIG. 1.
Figure 4A:
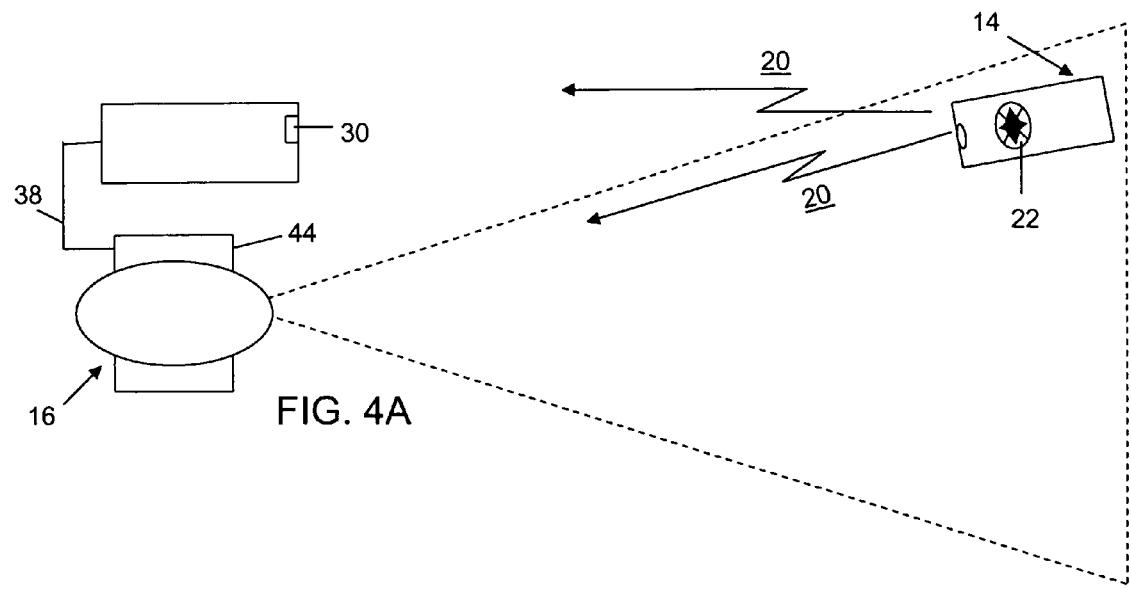
FIG. 4A is an overhead view of the system of FIG. 1, depicting the remote control emitting an IR signal within the field of view of the camera.
Figure 4B:
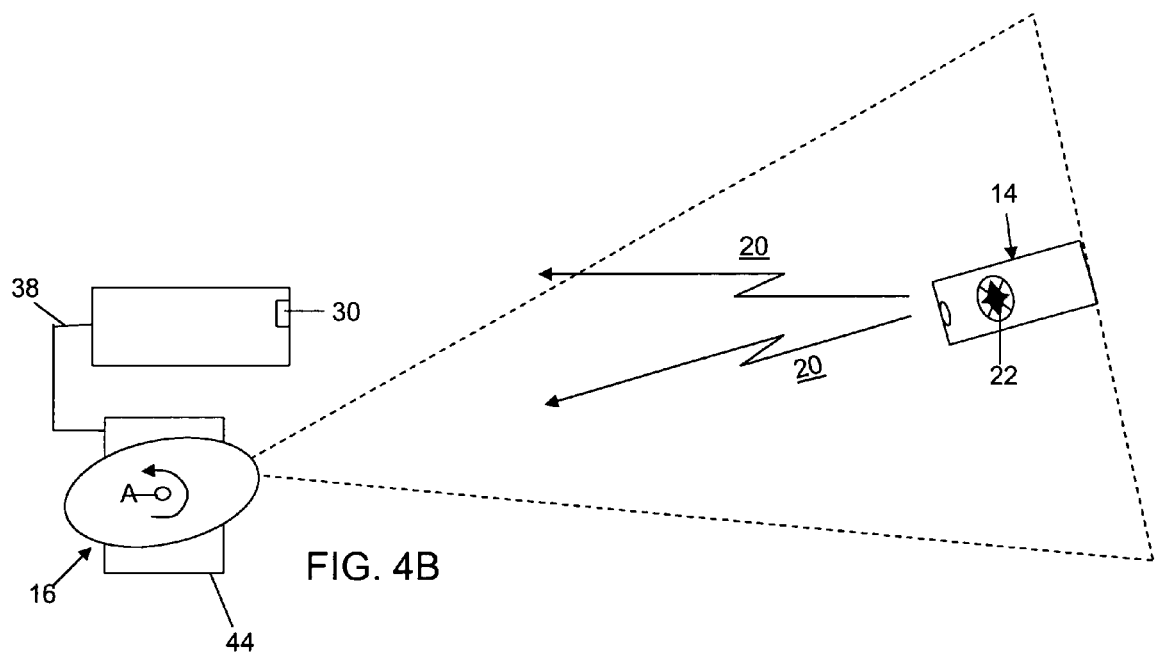
FIG. 4B is an overhead view of the system of FIG. 1, depicting the camera aligned with the IR signal.

FIG. 3 depicts a flowchart describing the steps implemented by system 10 of the embodiment of FIGS. 1 and 2, separately delineating the functions performed by the camera 16 and the functions performed by the computer 12. To initiate alignment of the camera, a user actuates the transmission of the spot signal and also actuates operation of the positioning subsystem. In a preferred embodiment, user actuation of both of these functions is accomplished by pressing button 22 on the remote control 14, causing the remote to emit an IR signal. In one embodiment, button 22 also initiates an autofocus routine using known techniques. Button 22 may be referred to as an alignment button or, if applicable, a focus button. In other embodiments, the remote control can be actuated by other means, for example, by voice activation.

Figure 5A:
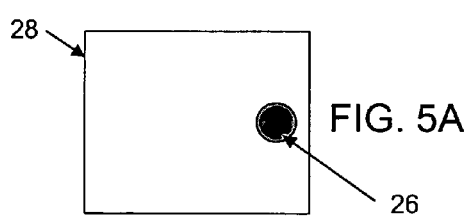
FIG. 5A depicts the camera's field of view from FIG. 4A, with a source spot created by the IR signal.
Figure 5B:
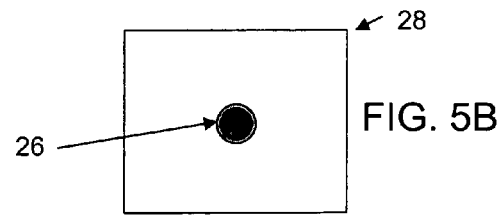
FIG. 5B depicts the camera's field of view from FIG. 4B, after being centered on the remote control.

The camera 16 includes an image sensor 24 (FIG. 1) that generates image data representative of the image in the camera's field of view (e.g., FIGS. 5A and 5B). The camera's field of view defines a frame 28. The IR signal or spot signal is captured by the image sensor of the camera, as spot 26 within frame 28 of the image data, as represented in FIG. 5A. In the embodiment of FIGS. 1-4, computer 12 also receives IR signal 20 via an IR port 30.

Upon receipt of the IR signal, the processing subsystem in computer 12 initiates analysis of the image data to identify and determine the location of the source spot. For this purpose, camera 16 has at least one data communications bus for coupling data from the image sensor to the processing subsystem. In addition, the data communications bus may be used to couple instructions from the processing subsystem to the automated positioning system.

According to the preferred embodiment of the present invention, image sensor 24 is responsive to light in the infrared range even though such light is not visible to the human eye. Sensors that are sensitive to IR are well known. It will be appreciated that the IR output from a remote control will "look" like a point source of light, that appears as a discrete, generally circular spot 26 in the image when the IR source is in the camera's field of view. This spot can be identified by its intensity, wavelength, size, uniformity or other characteristics, or by a combination of two or more of these characteristics.

If the IR-source spot is not at the desired alignment position, such as in the center of the frame, the computer calculates and sends instructions to the positioning system to rotate the camera into alignment with the source of the IR signal, i.e., the remote control device. Preferably, the alignment process is iterative, such that the camera is moved incrementally towards the alignment position, the image is re-analyzed, and the process is repeated until the camera is properly aligned. In order to provide iteratively processing spot signal must remain "on" This can be accomplished, for example, either by having the user actuate the alignment button throughout the process, or by configuring the remote to emit the signal for a predetermined period of time after the alignment button on the remote has been actuated. Alternatively, the camera or computer may be configured to send a signal to the remote when the alignment has been completed, such that once the alignment button is actuated the spot signal remains "on" until the remote is instructed to turn in "off" or until a timeout period expires. The described iterative process may be limited to a predetermined number of iterations. In addition, the system may be configured such that alignment is considered complete when the camera position falls within a predetermined range that is centered about exact alignment.

While normally alignment will entail centering the camera relative to the remote, the present invention can be used to align the camera at any desired location. Thus, for example, a user in a teleconference may want to position the camera such that the user is on one side of the image thereby allowing room to display items for discussion on the other side of the image. In addition, it will be appreciated that if the automated positioning subsystem can only rotate the camera about one axis, it will not be able to always center on the spot. In such a case, alignment constitutes bringing the camera into a position that is closest to the spot. Thus, for example, if the camera can only be rotated about a vertical axis, the camera will be aligned with a vertical line which runs through the spot.

In the exemplary embodiment, IR signal 20 performs two functions, i.e., it provides a spot that is detected by the image sensor, and it initiates analysis of the image data by the computer. In other embodiments, the remote control can be configured to provide separate signals for each function. For example, a first signal can be generated for detection by the image sensor, and a second signal can be generated to initiate analysis of the image data. Thus, for example, many computers are able to receive radio frequency (RF) signals, and such an RF signal may be used to activate computer processing. In selected embodiments, the first and second signals can be generated by the same, or distinct, emitting sources on the remote control. Moreover, while in the exemplary embodiment IR signals are used, in other embodiments, various other types of signals can be used, and the two signals need not be of the same type. Any signal used to locate the remote, however, must be of the type which produces a suitable spot at the camera's image sensor, so that the spot can be located by the processing subsystem. Thus, a point source of visible light at a specific frequency can similarly serve as a suitable spot signal.

As shown in FIGS. 1 and 2, the image sensor 24 is disposed in camera housing 32 and spaced from a lens 34 which focuses an image representing the camera's field of view onto the image sensor. In a preferred embodiment, the image sensor captures both visible light and IR, as emitted by the remote control. Camera 16 further includes an image processor 36 that, among other functions, processes image data from the image sensor, compressing the data before transmitting it to a computer or other system for display. The camera communicates with the computer 12 via any suitable means, such as USB connection 38 or wireless connection.

Preferably the positioning subsystem 18 of the camera 16 is capable of rotating the camera about vertical and horizontal axes, i.e., with two degrees of freedom. Alternatively, the positioning system may be limited to rotation about one axis, such as a vertical axis. A system which provides only one degree of rotational freedom, while less preferred, is less costly to produce and may be wholly acceptable for certain applications. It will be appreciated that for many applications it is only necessary to provide the ability to rotate the camera through relatively small arcs. Rotation is provided via one or more motors 40. Stepper motors are preferred because they can be positioned and controlled with a high degree of accuracy. FIG. 1 shows gear 42, driven by motor 40, attached to a base 44 of the camera to provide rotation of camera 16 about a vertical axis. As noted, in a preferred embodiment camera 16 can also be rotated about a horizontal axis, and two motors are preferred, although a single motor can be used to cause rotation in both directions. It will be understood that the drive mechanism has be shown in simplified form and that a more complex arrangement of gears, or other mechanisms for rotating the camera, may be used. As described above, movement to a desired position may be accomplished in an iterative fashion.

In one embodiment, motor 40 receives commands or instructions from the computer 12 via the image processor 36. As noted, the camera preferably has at least one internal communications bus coupling the image sensor, the image processor, the positioning subsystem and the processing subsystem. The instructions generated by the processing subsystem are calculated to point camera 16 in the proper direction by rotation of the camera into the desired alignment position. In this manner, the positioning subsystem rotates the housing 32 of the camera about one or both of the axes to pan and tilt the camera. In other embodiments, the camera may be limited to rotation about a single axis if that is all that is needed for a particular application.

Figure 6:
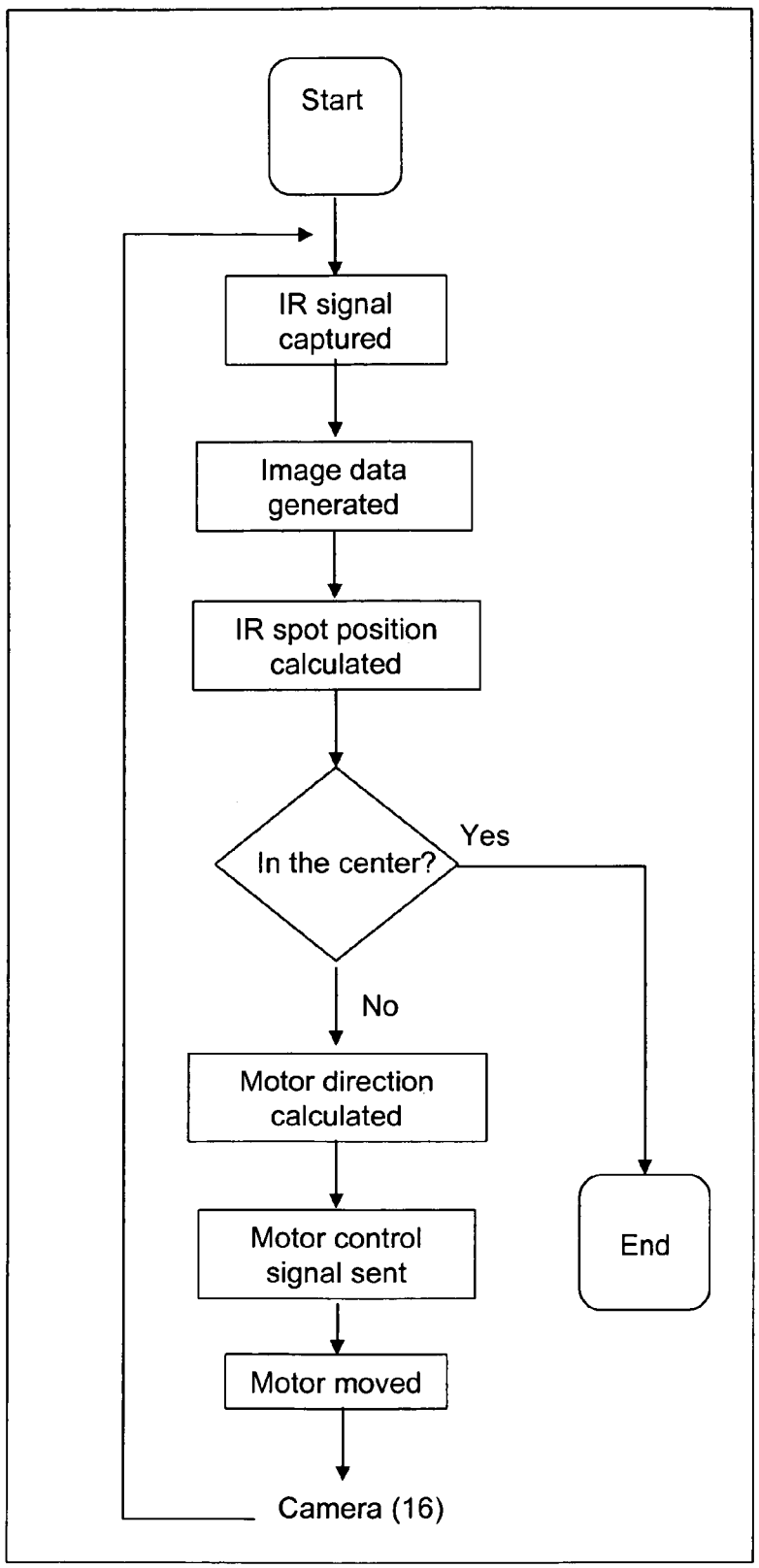
FIG. 6 is a simplified flow chart for operation of a second embodiment of a system in accordance with the invention.

FIG. 6 depicts flow chart for operation of a second embodiment of a system in accordance with the present invention. In this embodiment, the system includes a camera 16 which contains a processing subsystem. The processing subsystem of camera 16 operates like the previously described computer-based processing system. Thus, upon activation it is configured to identify the source spot within the image data, and to provide instructions to a drive mechanism for the positioning the camera. Camera 16 preferably includes an IR sensor which detects the emission of an activation signal from the remote. If the IR-source spot is not at the desired location within the frame, the camera's internal processing system generates the requisite instructions to align the camera. As discussed above with reference to FIG. 3, the system may be iterative, such that the processing subsystem repeats this process until the camera is aligned.

Figure 7:
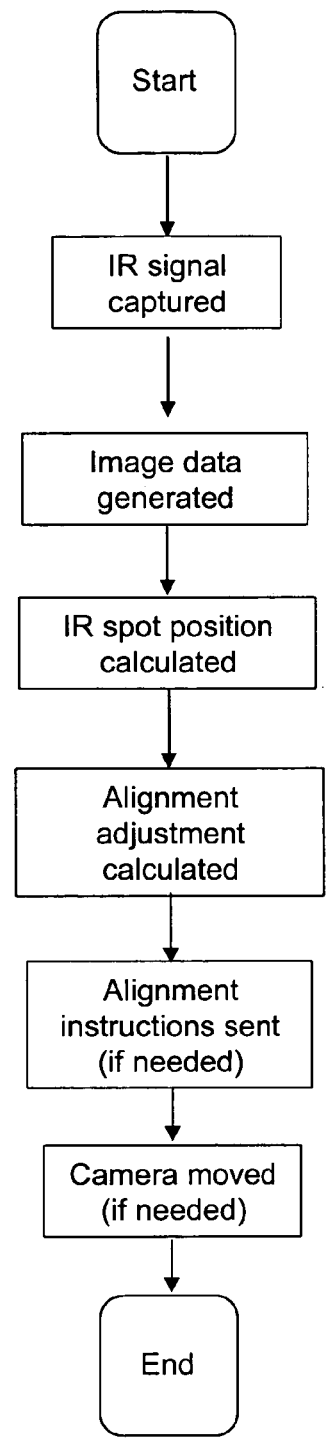
FIG. 7 is a simplified flow chart for operation of a third embodiment of a system in accordance with the invention.

In another embodiment of the invention, as shown in FIG. 7, the processing subsystem, whether computer based or in the camera, is configured to align the camera without need of iterative review of the image data. Upon activation, the processing subsystem analyzes the image data from the camera to identify the source spot, calculates its location and then uses the data to align the camera. In this embodiment, the spot signal need only be "on" for a brief time. While using this approach generally does not provide the same degree of alignment accuracy, in many situations it is not necessary to provide highly accurate alignment.

It should be appreciated from the foregoing that the present invention provides a system and method the automated positioned of a camera. The system includes a remote control configured to generate a prescribed signal in response to input from a user. The camera generates image data of the camera's field of view. The camera is configured to capture the prescribed signal as a source spot within the image data. The camera includes a positioning subsystem configured to orient the camera. The system further includes a processing subsystem configured to identify the source spot within the image data. Based upon the identified location, the processing subsystem provides instructions to the positioning subsystem to reorient the camera. In this manner, users of the system can align the camera upon a prescribed location, without needing to monitor camera output to ensure proper alignment.

Although the invention has been disclosed in detail with reference only to the preferred embodiments, those skilled in the art will appreciate that various other embodiments can be provided without departing from the scope of the invention. Accordingly, the invention is defined only by the claims set forth below.

What is claimed is:

1. A system for automated positioning of a camera, comprising:

a remote control for transmitting a spot signal when actuated by a user;

a digital camera for generating image data representative of an image received by the camera, the image data including spot signal data, an automated positioning subsystem configured to orient the camera; and a processing subsystem for receiving the image data and identifying the location of the spot signal within the image, and for providing instructions to the automated positioning subsystem to align the camera based upon the location of the spot signal.

2. The system of claim 1 wherein the automated positioning system comprises the ability to rotate the camera about vertical and horizontal axes.

3. The system of claim 1 wherein the remote control device has a button for actuating transmission of the spot signal.

4. The system of claim 1 further comprising a wireless communication port for receiving a activation signal from the remote control for activating the camera alignment process.

5. The system of claim 4 wherein the wireless communication port is configured to be activated by the spot signal, such that the spot signal is the activation signal.

6. The system of claim 5 wherein the signal is an infrared signal.

7. The system of claim 6 wherein the camera has an autofocus function and the infrared signal also activates the autofocus function.

8. The system of claim 4 wherein the wireless communications port is a radio receiver.

9. The system of claim 3 wherein the remote control device comprises a delay circuit for keeping the spot signal on for a predetermined period of time after the button has been actuated.

10. The system of claim 1 wherein the processing subsystem comprises an external computer coupled to the camera.

11. The system of claim 1 wherein the processing subsystem is housed within the camera.

12. The system of claim 1 wherein the positioning subsystem comprises at least one motor.

13. A system for automated positioning of a camera, comprising:
    a remote control configured to generate an IR signal when actuated by a user;
    a digital camera having a field of view and comprising an image sensor for generating image data, the image data including the IR signal as a source spot whenever the IR signal is generated within the field of view,
    a positioning subsystem configured to rotate the camera about at least one axis; and
    a wirelessly actuated processing subsystem which, when actuated, identifies the location of source spot within the image data and provides instructions to the positioning subsystem to rotate the camera into alignment with the source spot.

14. The system of claim 13 wherein the processing subsystem is at least partially housed within the digital camera.

15. The system of claim 13 wherein the positioning system is configured to rotate the camera about vertical and horizontal axes and the processing subsystem is configured to instruct the positioning subsystem to center the orientation of the camera on the location of the source spot.

16. The system of claim 13 wherein the remote control is configured to emit a signal that wirelessly actuates the processing subsystem.

17. The system of claim 16 wherein the IR signal both wirelessly actuates the processing system and serves as the source spot.

18. The system of claim 13, wherein the processing subsystem is configured to iteratively analyze the image data until the source spot is determined to be in alignment.

19. The system of claim 13 wherein the processing subsystem comprises an external computer.

20. A method of automated positioning of a camera, comprising:
    transmitting a spot signal from a remote source,
    using a digital camera to generate image data representative of the image within the camera's field of view, the image data including the spot signal,
    using an image processor coupled to the camera to locate the spot signal within the image data,
    using an automated positional control system coupled to the image processor to rotate the camera such that the spot signal is aligned at a desired position within the image data.

21. The method of claim 20 wherein the step of aligning the camera at a desired location is performed iteratively.

22. The method of claim 20 wherein the step of rotating include rotation about vertical and horizontal axes.

23. The method of claim 22 wherein the desired location is the center of the image.

24. The method of claim 20 wherein the transmitted spot signal is an IR signal generated by a remote control device.

25. The method of claim 24 wherein the remote control device actuates the step of rotating the camera.

26. The method of claim 25 wherein the IR signal actuates the step of rotating the camera.

27. The method of claim 20 wherein the image processor is contained within the camera.

28. The method of claim 20 wherein the image processor comprises an external computer coupled to the camera.

29. The method of claim 28 wherein the external computer is coupled to the automated positional control system.

30. An automated camera for a teleconference system, comprising:
    an image processor for generating image data corresponding to the image in the camera's field of view, the image processor being responsive to infrared light emitted from a remote control device,
    an automated positioning system for rotating the camera about at least one axis in response to instructions from an image analysis system, and
    at least one data communications bus for coupling the image data from the image processor to the image analysis system and for coupling instructions from the image analysis system with the automated positioning system.

31. The automated camera of claim 30 wherein the image analysis system is housed within the camera.

32. The automated camera of claim 31 further comprising a wireless communications port for receiving a signal from the remote control device which activates the image analysis system.

* * * * *

UNITED STATES PATENT AND TRADEMARK OFFICE
CERTIFICATE OF CORRECTION

PATENT NO. : 7,312,872 B2 Page 1 of 1
APPLICATION NO. : 11/081225
DATED : December 25, 2007
INVENTOR(S) : Shuto Ohta It is certified that error appears in the above-identified patent and that said Letters Patent is hereby corrected as shown below:

Column 4, Line 44, after "remain" delete ""on"" and insert -- "on." --.

Signed and Sealed this

Tenth Day of March, 2009

JOHN DOLL
*Acting Director of the United States Patent and Trademark Office*